United States Patent [19]

Hira et al.

[11] 4,444,704
[45] Apr. 24, 1984

[54] PROCESS FOR PRODUCING INTEGRAL SKIN POLYURETHANE FOAM

[75] Inventors: Yasuo Hira, Fujisawa; Susumu Tsuzuku, Tokyo; Masao Gotoh, Yokosuka; Hitoshi Yokono, Katsuta; Reishi Naka, Tochigi, all of Japan

[73] Assignee: Hitachi, Ltd., Tokyo, Japan

[21] Appl. No.: 340,657

[22] Filed: Jan. 19, 1982

[30] Foreign Application Priority Data

Jan. 26, 1981 [JP] Japan .................................. 56-9033
May 29, 1981 [JP] Japan .................................. 56-81016

[51] Int. Cl.³ ............................................. B29D 27/00
[52] U.S. Cl. ................................... 264/45.5; 264/53; 264/328.6; 521/51; 521/129; 521/167
[58] Field of Search ........... 264/DIG. 83, 45.5, 328.6, 264/53; 521/51, 129, 167

[56] References Cited

U.S. PATENT DOCUMENTS 4,126,742 11/1978 Carleton et al. ............ 264/DIG. 83
4,342,842 8/1982 Hira et al. ............................. 521/167

Primary Examiner—Philip E. Anderson
Attorney, Agent, or Firm—Antonelli, Terry & Wands

[57] ABSTRACT

Integral skin polymethane foams can be produced in a short time by impingement mixing a solution comprising polyols containing as an essential component a polyol derived from aromatic amine, a blowing agent and a special catalyst of tertiary amine salt having a hetero ring in the molecule, with a solution comprising one or more polyisocyanates, followed by injection into a closed mold and foaming and curing therein.

22 Claims, 4 Drawing Figures

PROCESS FOR PRODUCING INTEGRAL SKIN POLYURETHANE FOAM

BACKGROUND OF THE INVENTION

This invention relates to a process for producting an integral skin polyurethane foam.

Integral skin polyurethane foams produced by mixing an isocyanate, a polyether having active hydrogen, a blowing agent, a catalyst and the like, and conducting foaming and curing in a closed mold are excellent in thermal insulation, sound absorption, and strength, so that they are suitable for use as electric machinery and appliances, materials for electronic parts, building materials, etc. With recent development in reaction injection molding technique, applications of these foams are increasing remarkably. But one factor which restricts industrial applications of foamed polyurethane products is that the molding cycle is long, particularly the removal time of a foamed product from a mold (i.e., a time required for injecting the composition into the mold and taking out the foamed product from the mold) is long. That is to say, when a foamed product is taken out of a mold in a short time, there take place peeling of the skin, blister of the foam, generation of small voids on the surface, and the like, so that the molded material should be maintained in the mold for a long time compared with injection molding of thermoplastic resins.

In order to shorten the removal time of the foamed products from the mold, there have been proposed various processes such as increasing the amount of a catalyst, using a catalyst having high activity, raising the liquid temperature, and the like, but these processes also had disadvantages such as the flowability of the foam being lowered, surface properties of the foam becoming worse, and the like.

SUMMARY OF THE INVENTION

It is an object of this invention to provide a process for producing an integral skin polyurethane foam which is excellent in surface properties, and flowability and which can be taken out of the mold in a short time overcoming the disadvantages mentioned above.

This invention provides a process for producing an integral skin polyurethane foam which comprises impingement mixing at least two solutions one of which (a solution A) comprises polyols containing as an essential component at least one polyol of an alkylene oxide adduct of an aromatic amine having the formula:

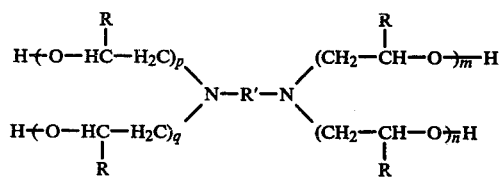

wherein R is hydrogen or a lower alkyl group; R' is an aromatic residue; and m, n, p and q are independently an integer of 1 or more, a blowing agent and as a catalyst at least one tertiary amine salt having a hetero ring in the molecule, and another of which (a solution B) comprises one or more polyisocyanates, injecting the resulting impingement mixed solution into a closed mold, and conducting foaming and curing in the closed mold.

BRIEF DESCRIPTION OF THE DRAWINGS

In the attached drawings.

DESCRIPTION OF THE PREFERRED EMBODIMENTS

Figure 1:
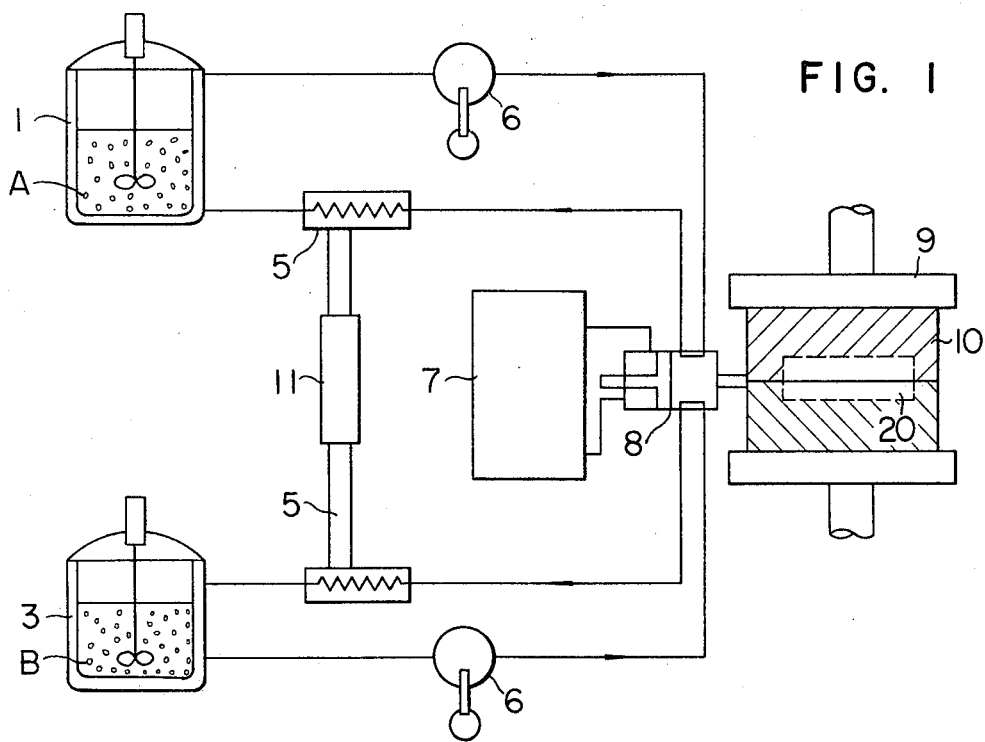
FIG. 1 is a diagrammatic illustration of a liquid reaction injection apparatus for producing an integral skin polyurethane foam according to this invention.

In order to shorten the removal time of foamed products from the mold in this invention, there is used the special composition containing the alkylene oxide adducts of aromatic amine having the formula (I) as an essential component in the polyol component together with a tertiary amine salt as a reaction accelerator.

This invention is explained in detail referring to individual components for forming integral skin polyurethane foams.

As the polyols, it is necessary to use (a) the alkylene oxide adduct of aromatic amine having the formula:

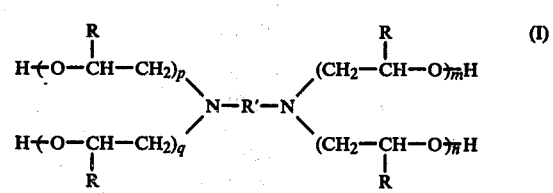

In the formula (I), a preferable example of R' is

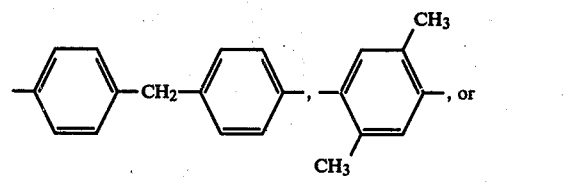

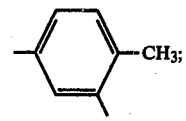

R is hydrogen or a lower alkyl group preferably having 1-5 carbon atoms, for example, a methyl group; and p, q, m and n are independently integer of preferably 1 to 10. As the alkylene oxide, there can be used ethylene oxide (EO), propylene oxide (PO), butylene oxide, epichlohydrin, and the like.

Concrete examples of the polyol (a) of alkylene oxide adducts of aromatic amines are ethylene oxide or propylene oxide adduct of diaminodiphenylmethane,

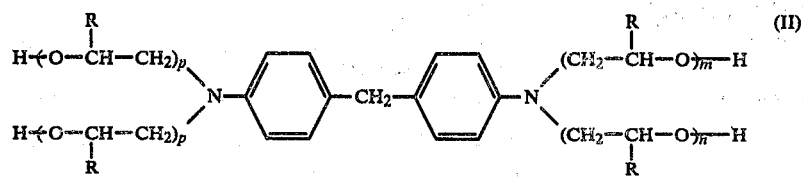

R=H, CH₃
m, n, p, q=1 to 10 ethylene oxide or propylene oxide adduct of tolylenediamine, ethylene oxide or propylene oxide adduct of xylylenediamine, and the like. Among these polyols (a), the ethylene oxide or propylene oxide adducts of diaminodiphenylmethane represented by the formula (II) are preferable. These polyols (a) can be prepared by a conventional process by reacting an alkylene oxide such as ethylene oxide, propylene oxide, etc., with an aromatic amine in the presence of a basic catalyst such as KOH.

As the polyols, there can be used (b) alkylene oxide (e.g. ethylene oxide, propylene oxide, butylene oxide, epichlorohydrin, etc.) adduct of aliphatic amines such as monoethanolamine, triethanolamine, ethylenediamine, triethylenetetramine, ammonia, hexamethylenediamine, diethylenetriamine, etc.

These polyols (b) can be prepared by reacting an aliphatic amine with an alkylene oxide in the presence of a basic catalyst such as KOH according to a conventional process.

As the polyols, there can also be used (c) conventionally used polyether polyols and polyester polyols, e.g., alkylene oxide (e.g. ethylene oxide, propylene oxide, butylene oxide, epichlorohydrin, etc.) adduct of glycerin, trimethylolpropane, pentaerythritol, diglycerin, sorbitol, sucrose, phenol, etc. It is also possible to use other polyols as the polyols (c) described in J. H. Saunders and K. C. Frish "Polymethanes Chemistry and Technology, Part I, Chemistry; Part II Technology," Robert E. Krieger Publishing Company, Huntington, N.Y., 1978; David Staly "Analytical Chemistry of the Polyurethanes, Polymethanes: Part III," Robert E. Krieger Publishing Company, Huntington, N.Y., 1979; and K. Iwata "LECTURES ON PLASTICS MATERIALS II: Polymethane Resins" published by Nikkan Kogyo Shinbun-sha, 1975.

As for the hydroxyl value of the polyols, it is preferable to use the polyols as a whole having an average hydroxyl value of 380 to 760 KOH mg/g. When the average hydroxyl value is too small such as lower than 380 KOH mg/g, the glass transition temperature of the produced foam becomes undesirably lower than 100° C., which easily makes the foam blistered at the time of removing the foam from the mold. On the other hand, when the average hydroxyl value is too large such as larger than 760 KOH mg/g, mold flashes are easily retained on the surface of the mold undesirably.

It is preferable to use the polyol (a) derived from an aromatic amine in an amount of 20 to 80 parts by weight and the polyol (b) derived from an aliphatic amine in an amount of 5 to 70 parts by weight and the polyol (c) in an amount of 0 to 50 parts by weight. By compounding 20 parts by weight or more of the polyol (a) derived from an aromatic amine, the hardness of foamed product at the time of removal from the mold becomes higher, which results in remarkably reducing breakage of molded articles by ejector pin. But when the amount of the polyol (a) is too large, the viscosity of the solution A becomes too high to conduct impingement mixing sufficiently. Since the polyol (b) derived from an aliphatic amine has a catalytic effect by itself, if the amount of the polyol (b) is too small, it cannot be expected a synergistic effect for shortening the removal time from a mold caused by together with a tertiary amine salt having hetero ring in the molecule.

As the isocyanates, there can be used diisocyanates, trifunctional or higher polyfunctional polyisocyanates alone or as a mixture thereof. Examples of the polyisocyanates are 4,4'-diphenylmethane diisocyanate (MDI) obtained by reacting a reaction product of aniline and formaldehyde with phosgene, polyphenylenepolymethylene polyisocyanate, carboxyimidized MDI, xylylene diisocyanate, isophorone diisocyanate, tolylene diisocyanate, and the like. Among these polyisocyanates, those of the formula:

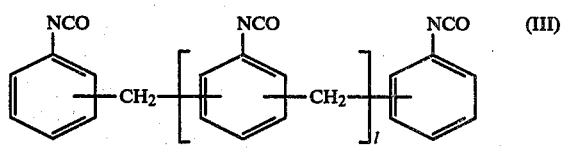

wherein l is 0.3 to 0.8, carbodiimidized MDI, and 4,4'-diphenylmethane diisocyanate are preferable.

The mixing ratio of said polyisocyanate to said polyol components is preferably in the range of 0.95–1.30/1 in terms of isocyanate index (a molar ratio of NCO groups in the isocyanate compound to OH groups in the polyols and water).

As the catalyst, it is necessary to use at least one tertiary amine salt having a hetero ring in the molecule. Examples of tertiary amines having a hetero ring in the molecule are diaza-bicyclo-alkenes such as 1,4-diazabicyclo[2,2,2]octane (triethylenediamine), 1,8-diazabicyclo[5,4,0]-undecene-7 (DBU), 1,5-diazabicyclo[4,2,0]octene-5, 1,8-diazabicyclo[7,2,0]undecene-8, 1,4-diazabicyclo[3,3,0]octene-4, 3-methyl-1,4-diazabicyclo[3,3,0]octene-4, 3,6,7,7-tetramethyl-1,4-diazabicyclo[3,3,0]octene-4, 7,8,8-trimethyl-1,5-diazabicyclo[4,3,0]nonene-5, 1,8-diazabicyclo[7,3,0]dodecene-8, 1,7-diazabicyclo[4,3,0]nonene-6, 1,5-diazabicyclo[4,4,0]decene-5, 1,8-diazabicyclo[7,4,0]tridecene-8, 1,8-diazabicyclo[5,3,0]decene-7, 9-methyl-1,8-diazabicyclo[5,3,0]decene-7, 1,6-diazabicyclo[5,5,0]tridecene-6, 1,7-diazabicyclo[6,5,0]tridecene-7, 1,8-diazabicyclo[7,5,0]tetradecene-8, 1,10-diazabicyclo[7,3,0]dodecene-9, 1,10-diazabicyclo[7,4,0]tridecene-9, 1,14-diazabicyclo[11,3,0]hexadecene-13, 1,14-diazabicyclo[11,4,0]-heptadecene-13; imidazoles such as 1-methylimidazole, 2-methylimidazole, 1,2-dimethylimidazole, 2-ethylimidazole, 2-ethyl-4-methylimidazole, etc. These compounds are characterized by having a nitrogen-containing ring structure in which the direction of unpaired electrons of nitrogen is fixed to some extent. These tertiary amines are used in the form of salts obtained by adding thereto a weak acid such as acid, formic acid, oxalic acid, propionic acid, phosphoric acid, 2-ethylhexoic acid, or the like, a strong acid such as nitric acid, hydrochloric acid, or the like, or a compound having a phenolic hydroxyl group such as phenol, cresol, or the like. The acids which are used in combination with the tertiary amines having a hetero ring in the molecule include Lewis acids and Bte,uml/o/ nsted acids. By masking the lone pair of the tertiary amine with an acid (i.e., in the form of salt of tertiary amine), the catalytic activity can be enhanced with an increase of temperature and the curing properties of the material can be enhanced without lowering flowability of the material.

The above-mentioned diaza-bicyclo-alkene phenol salts are disclosed in e.g., Japanese Patent Appln Kokoku (Post-Exam Publn) No. 40554/70 so as to improve a bad odor of tertiary amines. But in this invention, these tertiary amine salts are used in combination with the polyols (a) derived from aromatic amines and the polyols (b) derived from aliphatic amines in order to shorten the removal time of foamed products from the mold. The above-mentioned tertiary amine salts can be used along or in combination with one or more other conventionary used compounds having catalytic activity.

Examples of the conventional catalysts are triethylenediamine, dimethylethanolamine, morpholines, pyperidines, tin compounds such as dibutyltin dilaurate, dibutyltin acetate, tin octoate, etc.

The above-mentioned tertiary amine salt is used as a catalyst in an amount of 0.2 to 10 parts by weight per 100 parts by weight of the total polyol components. The conventional catalysts can be used in an amount of 0.2 to 10 parts by weight per 100 parts by weight of the total polyol components.

As foam stabilizers, there can be used conventional ones such as silicon compounds, e.g., various alkylene oxide modified polydimethylsiloxanes, fluorine series surface active agents. These foam stabilizers can be used in an amount of 1 to 5 parts by weight per 100 parts by weight of the total polyol components.

As blowing agents, there can be used water, low-boiling organic liquid compounds (halogenated hydrocarbons) such as trichloromonofluoromethane, dichlorodifluoromethane, methylene chloride, trichlorotrifluoroethane, tetrachlorodifluoroethane, etc., compounds which can generate nitrogen by decomposition such as azobisisobutyronitrile, etc. The blowing agent such as low-boiling organic liquid compounds is preferably used in an amount of 5 to 45 parts by weight per 100 parts by weight of the total polyol components. In the case of using water, 0.2 to 5 parts by weight of water can be used based on 100 parts by weight of the total polyol components. The compounds which can generate nitrogen by decomposition can be used in an amount of 5 to 20 parts by weight based on 100 parts by weight of the total polyol components. By changing the compounding amount of the blowing agent, there can be produced various foamed products having different densities. Among these blowing agents, halogenated hydrocarbons having lower boiling points (0° to 60° C.) are more preferable, since they can give strong skin to the foamed products.

Other additives conventionally used such as one or more fillers, pigments, dyes, fire retardants, ultraviolet light absorbers, etc., can be used in this invention. Such additives can be used by mixing them with either the polyol components or the polyisocyanate, or used as separate component (solution C) for impingement mixing.

According to this invention, the solution A containing the polyol components as major components and the solution B containing the polyisocyanate as major component, and if necessary a third solution (C) containing additives should be mixed in a very short time, i.e., should be impingement mixed by using, for example, a reaction injection molding machine, since the time required for from the mixing to gelation is remarkably short. When a known mixing method by using a low-pressure foaming machine is employed, no good integral skin foam cannot be obtained by using the composition used in this invention, since a longer time is necessary for mixing and the mixing efficiency is low.

The composition used in this invention is particularly effective for producing rigid integral skin foam and said composition cannot be thought of from various experiences for producing usual uniform foams, semi-rigid or flexible foams.

The process of this invention will be explained concretely referring to FIG. 1, which is a diagrammatic illustration of a liquid reaction injection apparatus used for practising the process of this invention. When the raw material liquids are not injected, the solution A comprising the polyols, the blowing agent, the catalyst, etc., stored in a raw material liquid tank 1 and the solution B comprising the polyisocyanate as major component stored in a raw material liquid tank 3 are transported to a mixing head 8 by individual high-pressure metering pumps 6, and then returned to the raw material liquid tanks 1 and 3 through individual heat exchangers 5 which are connected to a temperature regulator 11. When the raw material liquids are injected, the mixing head 8 is operated by an oil pressure unit 7 to inject the impingement mixed raw material liquids into a cavity 20 formed by a closed mold 10 placed between a clamping unit 9.

Foaming and curing of the injected raw materials in the cavity can be conducted according to a conventional process.

Figure 2:
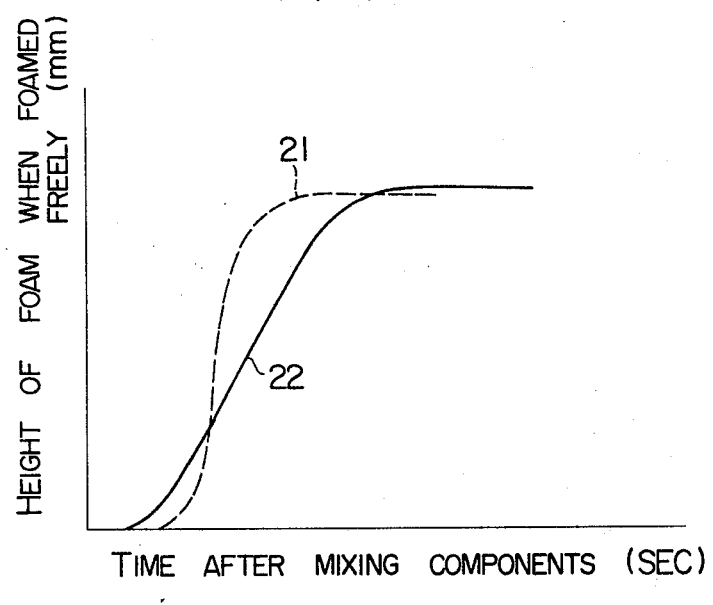
FIG. 2 is a graph showing rising behavior of foams when foamed freely.
Figure 3:
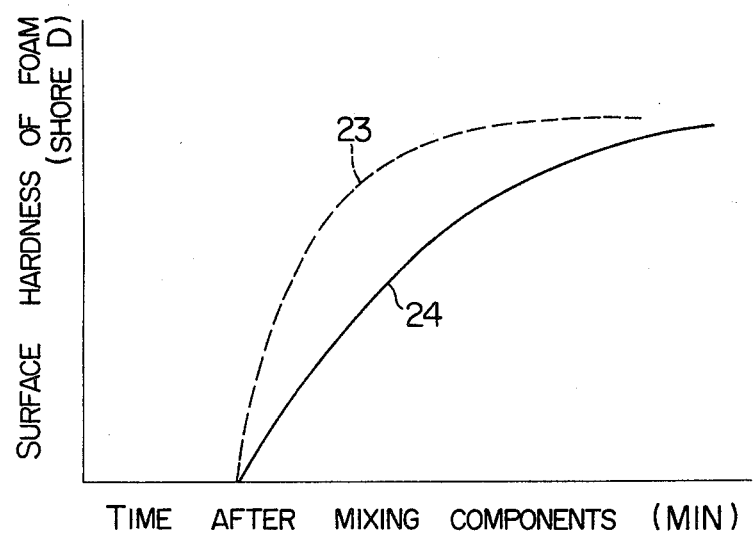
FIG. 3 is a graph showing changes of surface hardness of foams with the lapse of time.

The raw material composition used in this invention (i.e., the solutions A and B mentioned above and, if necessary the solution C mentioned above) has special properties quite different from those of known compositions. This is clearly shown in the attached FIGS. 2 and 3. FIG. 2 shows foaming behaviors of foams when foamed freely and FIG. 3 shows changes of surface hardness of foams (Shore D) with the lapse of time. In FIGS. 2 and 3, numerals 21 and 23 indicate the cases when the raw material compositions used in this invention are used, and numerals 22 and 24 indicate the case when known raw material compositions are used. There is no difference between densities of foamed products from the composition according to this invention and that according to the known process when foamed freely. But the features when the composition according to this invention is used are that although a time required for beginning foaming (a time required for the composition for beginning rising-hereinafter referred to as "CT (cream time)") is long, a time required for completing foaming (hereinafter referred to as "RT (rise time)") is short, i.e., a ratio of RT/CT is smaller and an increasing rate of surface hardness of the produced foam is remarkably large. This means that when integral skin foams are produced by using the composition according to this invention, the removal time of foamed products from the mold can be shortened and the resulting foams are excellent in surface properties.

Reaction injection molding machines usable in this invention are manufactured, for example, by Maruka Kako-Sha K.K. (Japan), Toho Kikai K.K. (Japan), Cincinnati Milacron Inc. (U.S.), Battenfeld Maschinenfabriken GmbH (West Germany), Elastogran Machinebau (West Germany), Maschinenfabrik Hennecke GmbH (West Germany), Krauss-Maffei AG (West Germany), etc.

As the molds, there can be used those made of metals such as aluminum, iron, or the like; those made from resins such as silicone rubber, epoxy resin, and the like; and those made of wood, etc.

According to this invention, since the special raw material composition, particularly special in the polyol components and the catalyst, is used, the mold temperature can be raised from the conventional mold temperature of about 45° to 50° C. to as high as 55° to 80° C. When foam molded at low temperature such as 45°–50° C., there is a tendency to retain fins in the mold. In order to remove such fins from the mold, a much time is required, which results in making the molding cycle undesirably longer. When the mold temperature is raised higher, there is a tendency that fins are not retained in the mold. But when the known raw material compositions are used, blisters are easily formed on the foam molded products due to the higher mold temperature. Therefore, it was not possible to raise the mold temperature, so long as the known raw material compositions were used. But, it is a surprising thing that the mold temperature can be raised to 55° to 80° C. when the raw material composition according to this invention is used.

If the mold temperature is too high, e.g., higher than 80° C., there is a tendency to lower the density of the skin layer of the resulting foam undesirably and fail to produce tough integral skin foamed articles.

Figure 4:
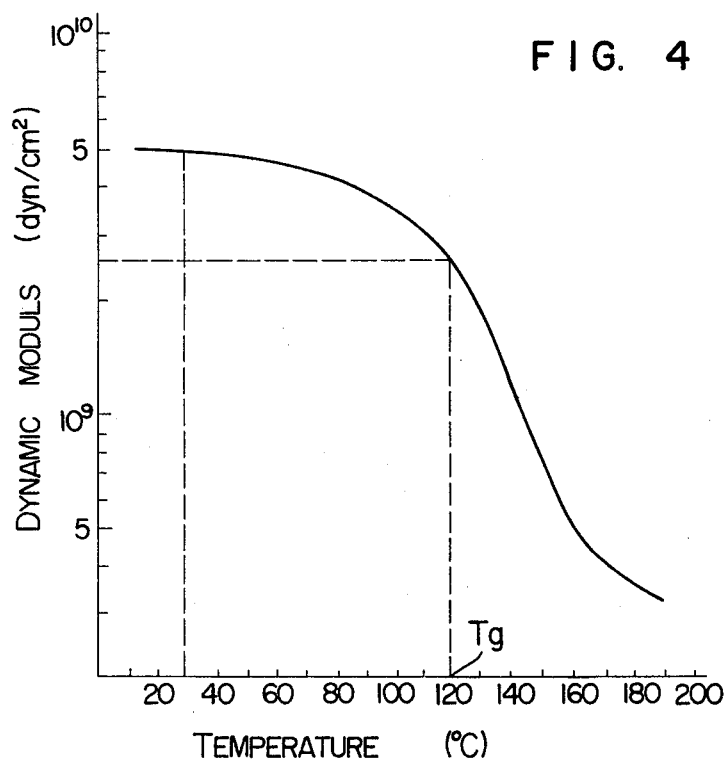
FIG. 4 is a graph showing a relationship between temperature properties of dynamic modulus and a glass transition temperature.

By raising the mold temperature to 55° C. or higher, the glass transition temperature of the skin of the foam produced becomes 100° C. or higher. The glass transition temperature (Tg) of the skin of the foam can be obtained from the temperature at which dynamic modulus of the skin of 1 to 2 mm in thickness (measured at vibration wave: sign wave, vibration frequency: 10 Hz, temperature rise rate: 1.5° C./min) begins to lower rapidly. The dynamic modulus (E) of the skin of a rigid integral skin polyurethane foam changes as shown in FIG. 4 and the glass transition temperature is shown by Tg in FIG. 4.

This invention is illustrated by way of the following Examples, in which all parts and percents are by weight unless otherwise specified. Particularly, the unit of figures in Tables 2, 4 and 6 is parts by weight.

EXAMPLE 1

Using the composition shown in Table 2, rigid integral skin polyurethane foams were produced by using apparatus and conditions as shown in Table 1. The foams having excellent properties as shown in Table 3 were produced in a short time.

More concretely, the solution A obtained by well mixing 30 parts of PO (propylene oxide) adduct of monoethanolamine (OH value 650 KOH mg/g), 40 parts of PO adduct of tolylenediamine (OH value 440 KOH mg/g), 30 parts of PO adduct of glycerin (OH value 513 KOH mg/g), 1.0 part of oxyalkylene adduct of polydimethylsiloxane, 15 parts of trichloromonofluoromethane, 0.25 part of phenol salt of 1,8-diazabicyclo[5,4,0]undecene-7 (DBU) and 0.75 part of triethylenediamine was impingement mixed with the solution B containing 140 parts of crude MDI (NCO content 30.5%) in a mixing ratio of the solution B/the solution A being 1.21 using a reaction injection molding machine (RIM machine) to give rigid integral skin polyurethane foams having an average density of 0.35 g/cm³. The total polyols in the raw material composition had a OH value of 524.9 KOH mg/g on an average. The reactivity (RT/CT ratio) was 3.4.

When the mold temperature was 48° C., foams having no blister, no crack and no peeling of the skin with high surface gloss were obtained when the mold removal time (the removal time of foams from the mold) was as short as 2 min 45 sec. or more, while when the mold temperature was 55° C., foams were also able to be formed without blister, cracks and peeling of the skin with the mold removal time of 2 min 45 sec. or longer contrary to the case of using known raw material compositions.

The surface hardness (Shore D) of foams measured at 3 min. 15 sec. after the mixing of the solutions A and B was as high as 56. Glass transition temperature, flexural strength and flexural modulus measured after allowed to stand the foams at room temperature for 24 hours were as good as 113° C., 195 kg/cm² and 68×10² kg/cm², respectively. When foams were removed from the mold with the mold removal time of 2 min. 30 sec. (mold temperature 55° C.), most of the fins were attached to the molded articles (foams) and scarcely retained on the mold surface, which resulted in making the cleaning of the mold remarkably easy.

EXAMPLES 2 TO 16

Rigid integral skin polyurethane foams were produced in the same manner as described in Example 1 by using the compositions shown in Table 2 and the apparatus and conditions as listed in Table 1. The foams were obtained in a short time and had excellent properties as shown in Table 3.

These compositions used therein were small in the RT/CT ratio and even when the foams were removed from the mold in a short time, no destruction of foams nor blisters were taken place. Further the foams had good surface gloss. The surface hardness measured after 3 min. 15 sec. of the mixing showed high values. Further, the foams had good values in the glass transition temperature, flexural strength and flexural modulus. When foams were removed from the mold with the mold removal time of 2 min. 30 sec. (mold temperature 60°–65° C.), most of the fins were attached to the molded articles (foams) and scarcely retained on the mold surface, which resulted in making the cleaning of the mold remarkably easy.

TABLE 1

| | Item | Contents |
|---|---|---|
| Apparatus | Mold | Made of steel, Cavity, inside size: 50 cm × 80 cm × 1.0 cm |
| | Reaction injection molding machine | RIM machine SH-15 type manufactured by Battenfeld Maschinenfabriken GmbH (West Germany) |
| Molding conditions | Mold temperature | 55–80° C., 48° C. |
| | Liquid temp. Solution A | 25° C. |
| | Liquid temp. Solution B | 25° C. |
| | Impingement mix- | 190 kg/cm² |

TABLE 1-continued

| Item | Contents |
|---|---|
| Measuring methods | |
| ing pressure | |
| Injection speed | 460 g/sec |
| CT, RT | Values were measured, when foamed freely. Measuring temp. 25° C. Open mold, 20 cm × 20 cm × 20 cm, made of wood was used. |
| Surface properties of a foam | Observed by the naked eye. |
| Surface hardness | Shore D hardness meter |
| Glass transition temperature | Dynamic modulus (E): Viscoelastisity spectrometer, mfd. by Iwamoto Seisakusho. vibration wave: sign wave, vibration frequency: 10 Hz temp. rise rate: 15° C./min. See FIG. 4. |
| Flexural strength | ASTM D790 |
| Flexural modulus | " |
| State of fin generated at molding | Observed by the naked eye |

TABLE 2

| Solution | Kind | Name | 1 | 2 | 3 | 4 | 5 | 6 | 7 | 8 |
|---|---|---|---|---|---|---|---|---|---|---|
| Solution A | Polyol derived from aliphatic amine | PO*¹ adduct of ethylenediamine (OH value: 540 KOH mg/g) | — | 40 | — | — | — | — | — | — |
| | | EO**² adduct of ethylenediamine (OH value: 580 KOH mg/g) | — | — | 40 | — | — | — | — | — |
| | | PO adduct of monoethanolamine (OH value: 650 KOH mg/g) | 30 | — | — | 15 | 40 | 60 | 40 | 40 |
| | | PO adduct of triethanolamine (OH value: 430 KOH mg/g) | — | — | — | — | — | — | — | — |
| | Polyol derived from aromatic amine | PO adduct of 4,4'-diaminodiphenyl-methane (OH value: 430 KOH mg/g) | — | 30 | 30 | 40 | 40 | 30 | 40 | 40 |
| | | PO adduct of tolylenediamine (OH value: 440 KOH mg/g) | 40 | — | — | — | — | — | — | — |
| | General polyol | PO adduct of sorbitol (OH value: 480 KOH mg/g) | — | — | — | — | — | — | — | — |
| | | PO adduct of glycerin (OH value: 513 KOH mg/g) | 30 | 30 | 30 | 25 | — | — | — | — |
| | | PO.EO adduct of glycerin (OH value: 60 KOH mg/g, PO/EO molar ratio: 2/1) | — | — | — | 20 | 20 | 10 | 20 | 20 |
| | Foam stabilizer | Oxyalkylene adduct of polydimethylsiloxane | 1.0 | 1.0 | 1.0 | 1.0 | 1.0 | 1.0 | 1.0 | 1.0 |
| | Blowing agent | H₂O | — | — | — | — | — | — | — | — |
| | | Trichloromonofluoromethane | 15 | 25 | 25 | 25 | 25 | 25 | 25 | 25 |
| | Catalyst | Phenol salt of DBU*³ | 0.25 | 3.0 | 1.5 | 3.5 | 3.0 | 2.5 | — | — |
| | | 2-Ethylhexanoate of DBU | — | — | — | — | — | — | 3.0 | — |
| | | Formate of triethylenediamine | — | — | 0.75 | — | — | — | — | 3.0 |
| | | Phenol salt of triethylenediamine | — | — | — | — | — | — | — | — |
| | | Triethylenediamine | 0.75 | — | — | — | — | — | — | — |
| | | Pentamethyldiethyltriamine | — | — | — | — | — | — | — | — |
| Solution B | Polyisocyanate | Crude MDI*⁴ (NCO content: 30.5 wt %) | 140 | — | — | — | — | — | — | — |
| | | Crude MDI*⁵ (NCO content: 30.5 wt %) | — | 133 | 137 | 109 | 118 | 140 | 105 | 118 |
| | | Carbodimide modified MDI (Carbodiimidization: 30 wt %, NCO content: 30 wt %) | — | — | — | — | — | — | — | — |

| Solution | Kind | Name | 9 | 10 | 11 | 12 | 13 | 14 | 15 | 16 |
|---|---|---|---|---|---|---|---|---|---|---|
| Solution A | Polyol derived from aliphatic amine | PO*¹ adduct of ethylenediamine (OH value: 540 KOH mg/g) | — | — | — | — | — | — | — | — |
| | | EO**² adduct of ethylenediamine (OH value: 580 KOH mg/g) | — | — | — | — | — | — | — | — |
| | | PO adduct of monoethanolamine (OH value: 650 KOH mg/g) | 40 | 40 | 40 | 40 | 40 | 40 | 40 | 40 |
| | | PO adduct of triethanolamine (OH value: 430 KOH mg/g) | — | — | — | — | — | — | — | — |
| | Polyol derived from aromatic amine | PO adduct of 4,4'-diaminodiphenyl-methane (OH value: 430 KOH mg/g) | 40 | 40 | 40 | 40 | 40 | 40 | 40 | 40 |
| | | PO adduct of tolylenediamine (OH value: 440 KOH mg/g) | — | — | — | — | — | — | — | — |
| | General polyol | PO adduct of sorbitol (OH value: 480 KOH mg/g) | — | — | — | — | — | — | — | — |
| | | PO adduct of glycerin (OH value: 513 KOH mg/g) | — | — | — | — | — | — | — | — |
| | | PO.EO adduct of glycerin (OH value: 60 KOH mg/g, PO/EO molar ratio: 2/1) | 20 | 20 | 20 | 20 | 20 | 20 | 20 | 20 |
| | Foam stabilizer | Oxyalkylene adduct of polydimethylsiloxane | 1.0 | 1.0 | 1.0 | 1.0 | 1.0 | 1.0 | 1.0 | 1.0 |
| | Blowing | H₂O | — | — | — | 0.5 | 0.25 | — | — | 1.0 |

TABLE 2-continued

| | agent | Trichloromonofluoromethane | 25 | 25 | 25 | 8 | 15 | 25 | 25 | — |
|---|---|---|---|---|---|---|---|---|---|---|
| | Catalyst | Phenol salt of DBU*[3] | — | 1.0 | 1.0 | 1.5 | 1.5 | 1.5 | 3.0 | 1.5 |
| | | 2-Ethylhexanoate of DBU | — | — | — | — | — | — | — | — |
| | | Formate of triethylenediamine | — | — | — | — | — | — | — | — |
| | | Phenol salt of triethylenediamine | 3.0 | — | — | — | — | — | — | — |
| | | Triethylenediamine | — | 0.75 | — | 0.5 | 0.5 | 0.5 | — | 0.5 |
| | | Pentamethyldiethyltriamine | — | — | 2.0 | — | — | — | — | — |
| Solution B | Polyisocyanate | Crude MDI*[4] (NCO content: 30.5 wt %) | — | — | — | — | — | — | — | — |
| | | Crude MDI*[5] (NCO content: 30.5 wt %) | 118 | 118 | 118 | 127 | 123 | — | — | 135 |
| | | Carbodimide modified MDI (Carbodiimidization: 30 wt %, NCO content: 30 wt %) | — | — | — | — | — | 122 | 122 | — |

Note to Table 2
*[1]PO = propylene oxide *[2]EO = ethylene oxide *[3]DBU = 1,8-diazabicyclo[5.4.0]undecene-7 *[4]MDI = 4,4'-diphenylmethane diisocyanate

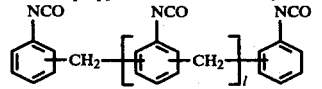

(l = 0.3 on an average)
*[5]MDI = 4,4'-diphenylmethane diisocyanate

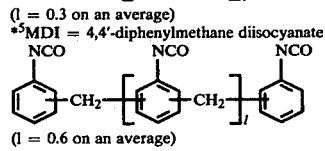

(l = 0.6 on an average)

TABLE 3

| Example No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Mixing ratio (Solution B/Solution A) weight ratio | 1.21 | 1.03 | 1.07 | 0.84 | 0.91 | 1.08 | 0.81 | 0.91 | 0.91 | 0.91 | 0.91 | 1.12 | 1.03 | 0.95 | 0.95 | 1.29 |
| Reactivity (RT/CT) | 3.4 | 3.3 | 3.5 | 3.2 | 3.8 | 3.9 | 3.2 | 3.5 | 3.8 | 3.3 | 3.4 | 3.9 | 4.0 | 4.2 | 3.4 | 3.9 |
| Average OH value of total polyols (KOH mg/g) | 524.9 | 498.9 | 514.9 | 409.8 | 444 | 525 | 444 | 444 | 444 | 444 | 444 | 444 | 444 | 444 | 444 | 444 |
| Average density of foam (g/cm³) | 0.35 | 0.35 | 0.35 | 0.30 | 0.3 | 0.30 | 0.30 | 0.30 | 0.30 | 0.30 | 0.30 | 0.35 | 0.35 | 0.30 | 0.30 | 0.60 |
| Properties of integral skin foam — Surface properties of foam at various removal time of foam from the mold *1 — Mold temperature (°C) | 48 | 48 | 48 | 48 | 48 | 48 | 48 | 48 | 48 | 48 | 48 | 48 | 48 | 48 | 48 | 48 |
| 2 min | x | x○ | x○ | x○ | x○ | x○ | x○ | x○ | x○ | x○ | x○ | x○ | x○ | x○ | x○ | ○ |
| 2 min 15 sec | x | ○ | ○ | ○ | ⊚ | ○ | ○ | ⊚ | ⊚ | ⊚ | ⊚ | ⊚ | ⊚ | ⊚ | ⊚ | ⊚ |
| 2 min 30 sec | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| 2 min 45 sec | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| 2 min 50 sec | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| 3 min | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| Surface properties and state of fin of foam at various removal time of foam from the mold *1 — Mold temperature (°C) | 55 | 60 | 60 | 65 | 65 | 65 | 65 | 65 | 65 | 65 | 65 | 65 | 65 | 65 | 65 | 65 |
| 2 min | x | ○ | ○ | ○ | ○ | ○ | ○ | ○ | ○ | ○ | ○ | ○ | ○ | ○ | ○ | ○ |
| 2 min 15 sec | ○ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| 2 min 30 sec | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| 2 min 45 sec | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| 2 min 50 sec | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ | ⊚ |
| 3 min — State of fin when removed from the mold at 2 min 30 sec *2 | ○ | ○ | ○ | ○ | ○ | ○ | ○ | ○ | ○ | ○ | ○ | ○ | ○ | ○ | ○ | ○ |
| Surface hardness (Shore D) | 56 | 60 | 60 | 58 | 55 | 56 | 55 | 54 | 53 | 54 | 54 | 57 | 62 | 52 | 53 | 55 |
| Glass transition temperature (°C) | 113 | 105 | 110 | 105 | 110 | 115 | 104 | 109 | 110 | 108 | 104 | 108 | 105 | 101 | 100 | 120 |
| Flexural strength (kg/cm²) | 195 | 198 | 200 | 180 | 178 | 168 | 169 | 170 | 170 | 170 | 172 | 210 | 220 | 169 | 165 | 410 |
| Flexural modulus (10² kg/cm²) | 72 | 75 | 74 | 68 | 65 | 67 | 65 | 64 | 65 | 62 | 58 | 68 | 70 | 62 | 65 | 120 |

Note to Table 3
*1: x: Blisters, cracks, or peeling of the skin took place.
○: No blister, crack, nor peeling but relatively poor in surface gloss
⊚: No blister, crack, nor peeling and good in surface gloss
*2: ○: Fins were almost attached to a molded product (foam) and almost no fin was retained in the mold.

EXAMPLES 17 TO 19

Rigid integral skin polyurethane foams were produced in the same manner as described in Example 1 by using the compositions shown in Table 4 and the apparatus and conditions as listed in Table 1. The foams were obtained in a short time and had excellent properties as shown in Table 5.

The compositions used therein were small in the RT/CT ratio. When the mold temperature was raised to 60°, 70° and 80° C., the foams having no destruction nor blisters but with good surface gloss could be removed from the mold at the mold removal time of 2 min, 1 min 45 sec and 1 min 45 sec. The surface hardness measured after 3 min 15 sec of the mixing showed high values. The density of the foams was good in uniformity. Further, the foams had good values in the glass transition temperature, flexural strength and flexural modulus. When the foams were removed from the mold in a short time, fins were scarcely retained on the mold surface as shown in Table 5.

EXAMPLES 20 AND 21.

Rigid integral skin polyurethane foams were produced in the same manner as described in Example 1 by using the compositions shown in Table 4 and the apparatus and conditions as listed in Table 1. The foams having excellent properties as shown in Table 5 were obtained in a short time. When the foams were removed from the mold in a short time, fins were scarcely retained on the mold surface as shown in Table 5.

TABLE 4

| Solution | Kind | Name | 17 | 18 | 19 | 20 | 21 |
|---|---|---|---|---|---|---|---|
| Solution A | Polyol derived from aliphatic amine | PO adduct of monoethanolamine (OH value: 440 KOH mg/g) | 40.5 | 40.5 | 40.5 | 50 | 60 |
| | Polyol derived from aromatic amine | PO adduct of 4,4'-diaminodiphenylmethane (OH value: 440 KOH mg/g) | 34.5 | 34.5 | 34.5 | 40 | 40 |
| | General polyol | PO.EO adduct of glycerin (OH value: 58 KOH mg/g) (PO/EO molar ratio = 2/1) | 25.0 | 25.0 | 25.0 | 10 | — |
| | Foam stabilizer | Oxyalkylene adduct of polydimethylsiloxane | 2.0 | 2.0 | 2.0 | 2.0 | 2.0 |
| | Blowing agent | $H_2O$ | 0.25 | 0.25 | 0.25 | 0.25 | — |
| | | Trichloromonofluoromethane | 8.0 | 8.0 | 8.0 | 8.0 | 8.0 |
| | Catalyst | Phenol salt of DBU | 0.25 | 0.25 | 0.25 | 0.3 | 0.3 |
| | | Dipropylene glycol solution of DABCO *1 (DABCO content: 33.3 wt %) | 2.0 | 2.0 | 2.0 | 3.0 | 3.0 |
| | Black pigment | Glycerin PO adduct of carbon black (Carbon black amount: 30 wt %) | 2.0 | 2.0 | 2.0 | 2.0 | 2.0 |
| Solution B | Polyisocyanate | Crude MDI (NCO content: 31 wt %) (Average functional group number: 2.6) | 136 | 136 | 136 | 165 | 184 |

Note
*1 DABCO = 1,4-diazabicyclo[2,2,2]octane

TABLE 5

| Example No. | | 17 | 18 | 19 | 20 | 21 |
|---|---|---|---|---|---|---|
| Mixing ratio (Solution B/Solution A) weight ratio | | 1.18 | 1.18 | 1.18 | 1.46 | 1.63 |
| Reactivity (RT/CT) | | 3.5 | 3.5 | 3.5 | 3.9 | 3.9 |
| Average OH value of total polyols (KOH mg/g) | | 514.6 | 514.6 | 514.6 | 611.8 | 692 |
| Average density of foam (g/cm$^3$) | | 0.36 | 0.36 | 0.36 | 0.36 | 0.36 |
| Mold temperature (°C.) | | 48 | 60 | 70 | 80 | 70 | 80 |
| Surface properties of foam at various removal time of foam from the mold *1 | 1 min 30 sec | — | ○ | ○ | ○ | ○ | ○ |
| | 1 min 45 sec | — | ○ | ◉ | ◉ | ○ | ○ |
| | 2 min | ○ | ◉ | ◉ | ◉ | ◉ | ◉ |
| | 2 min 15 sec | — | ◉ | ◉ | ◉ | ◉ | ◉ |
| | 2 min 30 sec | ◉ | ◉ | ◉ | ◉ | ◉ | ◉ |
| | 3 min | ◉ | — | — | — | — | — |
| | 3 min 30 sec | ◉ | — | — | — | — | — |
| State of fin of foam when removed from the mold *2 | 1 min 30 sec | — | ○ | ○ | ○ | ○ | ○ |
| | 2 min 30 sec | — | ◉ | ◉ | ◉ | ◉ | ◉ |
| Surface hardness (Shore D) | | 62 | 68 | 69 | 70 | 72 |
| Glass transition temperature (°C.) | | 125 | 125 | 125 | 130 | 130 |
| Flexural strength (kg/cm$^2$) | | 200 | 200 | 200 | 220 | 220 |
| Flexural modulus ($10^2$ kg/cm$^2$) | | 68 | 68 | 68 | 70 | 72 |

Note
*1: See Table 3
*2: ◉ No fin was retained in the mold
○ Fins were almost attached to a molded product and almost no fin was retained in the mold.

EXAMPLE 22

Rigid integral skin polyurethane foams were produced by using the composition of Example 17 shown in Table 4 except for using a PO adduct of tolylenediamine (OH value 440 KOH mg/g) in place of the PO adduct of 4,4'-diaminodiphenylmethane and the mixing ratio of 0.90 in place of 1.18 and by using also the apparatus and conditions as listed in Table 1. The reactivity (RT/CT ratio) was 3.6.

The average density of the foams was 0.36 g/cm$^3$. When foams were removed from the mold (mold temperature 48° C.) with the mold removal time of 3 min, the foams had no blister, cracks nor peeling of the skin layer but had good surface gloss. When the mold temperature was raised to 60° C., there were obtained foams having good surface gloss without blisters, cracks and the peeling of the skin layer with the mold removal time of 2 min 15 sec. The surface hardness (shore D) of foams measured at 3 min 15 sec after the mixing of the solutions A and B was as high as 60. The density of the foams was good in uniformity. The foams had the glass transition temperature of 120° C., the flexural strength of 180 kg/cm$^2$ and the flexural modulus of $65 \times 10^2$ kg/cm$^2$, these values being good. When the mold temperature was 60° C., foams could be removed from the mold with the mold removal time of 2 min 15 sec or longer scarcely retaining fins on the mold surface. Thus the cleaning of the mold was very easy. Comparative Examples 1 to 5

Integral skin foams were produced in the same manner as described in Example 1 by using the compositions shown in Table 6 and the apparatus and conditions as listed in Table 1. Properties of the resulting foams were as shown in Table 7.

The foams had almost the same values as those obtained in the Examples as to the glass transition temperature, the flexural strength and the flexural modulus, but these foams showed either blisters or poor surface gloss when removed from the mold with the mold removal time of 3 min. In Comparative Example 2, voids were observed on the surface. Further the surface hardness measured after 3 min 15 sec from the mixing of the solutions A and B was almost lower than those of the Examples. As to the reactivity, the value of RT/CT ratio was larger than those of the Examples. When foams were removed from the mold with the mold removal time of 2 min 30 sec, considerable amount of fins were retained in the mold surface, which resulted in making the cleaning of the mold time consuming. When the mold temperature was raised to 55° C., blisters were formed on the surface of the resulting foam.

TABLE 6

| Solution | Kind | Name | Comparative Example No. | | | | |
|---|---|---|---|---|---|---|---|
| | | | 1 | 2 | 3 | 4 | 5 |
| Solution A | Polyol derived from aliphatic amine | PO adduct of ethylenediamine (OH value: 540 KOH mg/g) | 40 | — | 40 | — | — |
| | | PO adduct of triethanolamine (OH value: 430 KOH mg/g) | — | — | — | 30 | — |
| | General polyol | PO adduct of sorbitol (OH value: 480 KOH mg/g) | 20 | 40 | 20 | 40 | 40 |
| | | PO adduct of glycerin (OH value: 513 KOH mg/g) | 40 | 60 | 40 | 30 | 60 |
| | Foam stabilizer | Oxyalkylene adduct of polydimethylsiloxane | 1.0 | 1.0 | 1.0 | 1.0 | 1.0 |
| | Blowing agent | H$_2$O | — | — | — | 0.5 | 1.0 |
| | | Trichloromonofluoromethane | 25 | 25 | 25 | 8 | — |
| | Catalyst | Triethylenediamine | 3.0 | — | — | 3.0 | — |
| | | Pentamethyldiethylenetriamine | — | — | 3.0 | — | 2.5 |
| | | Phenol salt of triethylenediamine | — | 3.0 | — | — | — |
| Solution B | Polyisocyanate | Crude MDI (NCO content: 31 wt %) | 138 | 133 | 138 | 135 | 150 |

TABLE 7

| | Comparative Example No. | | | | |
|---|---|---|---|---|---|
| | 1 | 2 | 3 | 4 | 5 |
| Mixing ratio (Solution B/Solution A) weight ratio | 1.07 | 1.05 | 1.07 | 1.21 | 1.43 |
| Reactivity (RT/CT) | 5.6 | 4.6 | 5.2 | 6.2 | 7.2 |
| Average OH value of total polyols (KOH mg/g) | 517 | 499.8 | 517 | 474.9 | 499.8 |
| Average density of foam (g/cm$^3$) | 0.35 | 0.35 | 0.30 | 0.30 | 0.6 |
| Mold temperature (°C.) | 48 | 48 | 48 | 48 | 48 |
| Surface properties of foam when removed from the mold at 3 min *1 | X | Δ | X | X | X |
| State of fin of form when removed from the mold at 2 min 30 sec *2 | x | x | x | x | x |
| Surface hardness (Shore D) | 48 | 49 | 42 | 43 | 55 |
| Glass transition temperature (°C.) | 103 | 105 | 104 | 100 | 100 |
| Flexural strength (kg/cm$^2$) | 170 | 178 | 168 | 168 | 115 |
| Flexural modulus (10$^2$ kg/cm$^2$) | 73 | 72 | 65 | 64 | 115 |

Note
*1: X: Blister(s) was formed or the surface was poor in gloss.
Δ: Cracks were formed on the surface.
*2: x: Fin was considerably retained on the mold surface.

As mentioned above, according to this invention, the removal time of molded foams from the mold can be reduced remarkably. Further, since the mold temperature can be raised to 55° to 80° C. because of the use of special raw material composition, the molding cycle can be shortened remarkably compared with conventional processes, which results in increasing the producibility effectively and remarkably.

Integral skin polyurethane foams produced by the process of this invention can widely be used in electronic components, electric components, automotive parts, building materials, etc., which are particularly required to have heat insulation, sound absorption and light-weight.

What is claimed is:

1. A process for producing an integral skin polyurethane foam which comprises:
   impingement mixing at least two solutions, one of which comprises polyols containing:
   (a) at least one polyol of an alkylene oxide adduct of an aromatic amine having the formula:

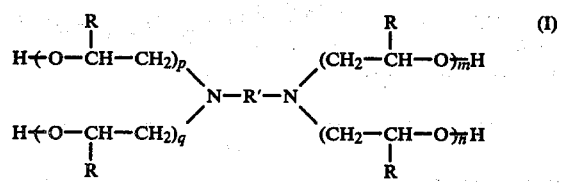

wherein R is hydrogen or a lower alkyl group; R' is an aromatic residue; and m, n, p and q are independently an integer of 1 or more, in an amount of 20 to 80 parts by weight,
   (b) at least one polyol of an alkylene oxide adduct of aliphatic amine in an amount of 5 to 70 parts by weight, and
   (c) at least one polyether polyol or polyester polyol in an amount of 0 to 50 parts by weight,
   a blowing agent and as a catalyst at least one tertiary amine salt having a hetero ring in the molecule, and another solution of which comprises one or more polyisocyanates in an amount of 0.95/1 to 1.30/1 in terms of isocyanate index,
   injecting the resulting impingement mixed solution into a closed mold, and
   conducting foaming and curing in the closed mold.

2. A process according to claim 1, wherein in the formula (I) R is hydrogen or a methyl group, R' is

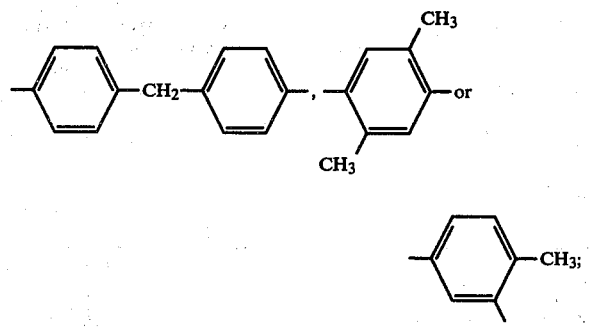

m, n, p, and q are independently an integer of 1 to 10.

3. A process according to claim 1, wherein the catalyst is at least one acid salt, phenol salt or cresol salt of a diazabicyclo-alkane or an imidazole.

4. A process according to claim 3, wherein the catalyst is a phenol salt of 1,8-diazabicyclo[5,4,0]-undecene-7.

5. A process according to claim 1, wherein the polyisocyanate is one represented by the formula:

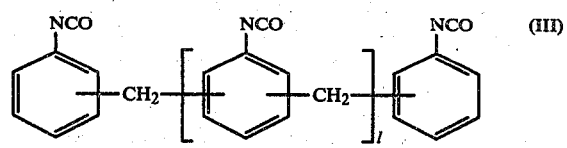

wherein l is 0.3 to 0.8.

6. A process according to claim 1, wherein the polyols have an average hydroxyl value of 380 to 760 KOH mg/g.

7. A process according to claim 1, wherein the blowing agent is a low-boiling halogenated hydrocarbon.

8. A process according to claim 1, wherein the closed mold has a mold temperature of 45° to 80° C.

9. A process according to claim 8, wherein the closed mold has a mold temperature of 55° to 80° C.

10. A process according to claim 1, wherein the solutions are three solutions, one of which comprises polyols containing as an essential component at least one polyol of an alkylene oxide adduct of an aromatic amine having the formula (I), a blowing agent and as a catalyst at least one tertiary amine salt having a hetero ring in the molecule, another of which comprises one or more polyisocyanates and the rest of which comprises at least one component selected from the group consisting of pigments, dyes, and blowing agents.

11. A process for producing an integral skin polyurethane foam which comprises:
    impingement mixing at least two solutions, with (a) one of said at least two solutions comprising (1) polyols containing at least one polyol of an alkylene oxide adduct of an aromatic amine having the formula:

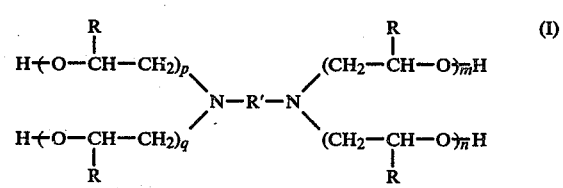

wherein R is hydrogen or a lower alkyl group; R' is an aromatic residue; and m, n, p and q are independently an integer of 1 or more; (2) a blowing agent; and (3) a catalyst for producing the polyurethane comprising at least one tertiary amine salt having a hetero ring in the molecule, and (b) another of said at least two solutions comprising one or more polyisocyanates,
   injecting the resulting impingement mixed solution into a closed mold, and
   conducting foaming and curing in the closed mold to provide a polyurethane foam having an integral skin.

12. A process according to claim 11, wherein the polyisocyanate is used in an amount of 0.95/1 to 1.30/1 in terms of isocyanate index.

13. A process according to claim 11 or 12, wherein R' is:

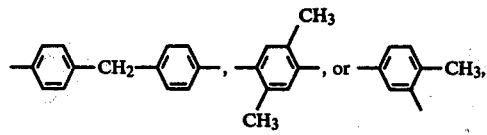

R is hydrogen or lower alkyl group, and m, n, p and q are independently integers of 1 to 10.

14. A process according to claim 13, wherein said lower alkyl group has 1–5 carbon atoms.

15. A process according to claim 11, wherein said at least one polyol is selected from the group consisting of ethylene oxide or propylene oxide adduct of diaminodiphenylmethane, ethylene oxide or propylene oxide adduct of tolyenediamine, and ethylene oxide or propylene oxide adduct of xylylenediamine.

16. A process according to claim 11, wherein said polyols have an average hydroxyl value of 380 to 760 KOH mg/g.

17. A process according to claim 11, wherein the hetero ring of the catalyst is a nitrogen-containing ring.

18. A process according to claim 17, wherein the at least one tertiary amine salt includes a salt of a tertiary amine selected from the group consisting of diazobicyclo-alkenes and imidazoles.

19. A process according to claim 11, wherein the at least one tertiary amine salt is formed by adding to a tertiary amine formic acid, oxalic acid, propionic acid, phosphonic acid, 2-ethylhexoic acid, nitric acid, hydrochloric acid, or a compound having a phenolic hydroxyl group.

20. A process according to claim 19, wherein said compound having a phenolic hydroxyl group is phenol or cresol.

21. A process according to claim 11, wherein said at least one tertiary amine salt is used in an amount of 0.2 to 10 parts by weight per 100 parts by weight of said polyols.

22. A process according to claim 11, wherein said polyols also include alkylene oxide adducts of aliphatic amines.

* * * * *